(12) United States Patent
Prabhakar et al.

(10) Patent No.: US 8,762,915 B1
(45) Date of Patent: Jun. 24, 2014

(54) SYSTEM AND METHOD FOR INTEGRATED CIRCUIT DIE SIZE REDUCTION

(75) Inventors: Balaji Prabhakar, Tamilnadu (IN); Sunil Kumar Singla, Ludhiana (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 260 days.

(21) Appl. No.: 12/884,264

(22) Filed: Sep. 17, 2010

(51) Int. Cl.
*G06F 9/455* (2006.01)
*G06F 17/50* (2006.01)

(52) U.S. Cl.
USPC ............ 716/113; 716/108; 716/134; 716/135

(58) Field of Classification Search
CPC ............ G06F 17/5031; G06F 17/5045; G06F 2217/84; G06F 17/505; G06F 17/5022; G06F 1/10; G06F 17/5059; G06F 17/5077; G06F 2217/12; G06F 2217/62; G06F 17/5027; G06F 17/5054
USPC .................................. 716/108, 113, 134, 135
See application file for complete search history.

(56) References Cited

U.S. PATENT DOCUMENTS

| 5,355,037 | A | * | 10/1994 | Andresen et al. | 327/158 |
| 5,570,383 | A | * | 10/1996 | Brown et al. | 714/815 |
| 7,831,877 | B2 | * | 11/2010 | Sul et al. | 714/731 |
| 8,631,368 | B2 | * | 1/2014 | Bai et al. | 716/113 |
| 2005/0055614 | A1 | * | 3/2005 | Yeh | 714/726 |

* cited by examiner

*Primary Examiner* — Jack Chiang
*Assistant Examiner* — Brian Ngo
(74) *Attorney, Agent, or Firm* — Amin, Turocy & Watson, LLP

(57) ABSTRACT

A circuit analysis tool is provided for die size reduction analysis. A processor determines a first initial output slack time. If the first initial output slack time is greater than zero, a first circuit element is modeled with a second die area, less than the first die area. The second die area is associated with a third delay greater than the first delay. Then, the second data signal is modeled equal to the first data signal with the third delay. If a first modified output slack time is greater than or equal to zero, the first circuit element first die can be replaced with the second die. If the first modified output slack time is a first value less than zero, a first delay is added to the clock signal that is greater than or equal to the first value.

14 Claims, 16 Drawing Sheets

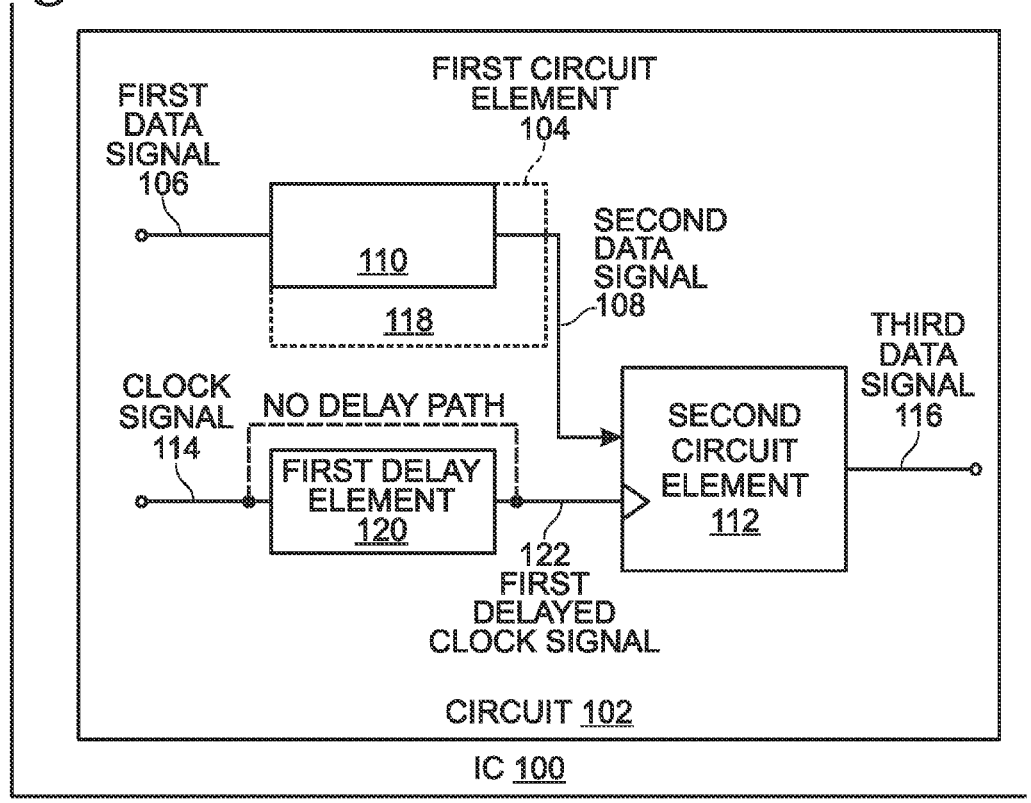
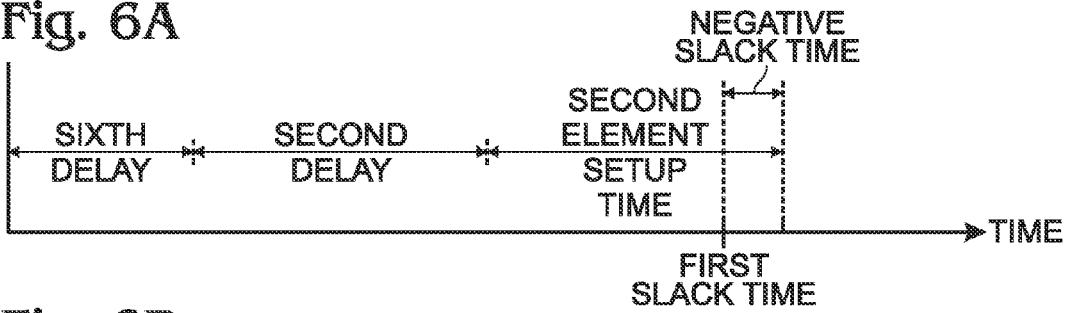
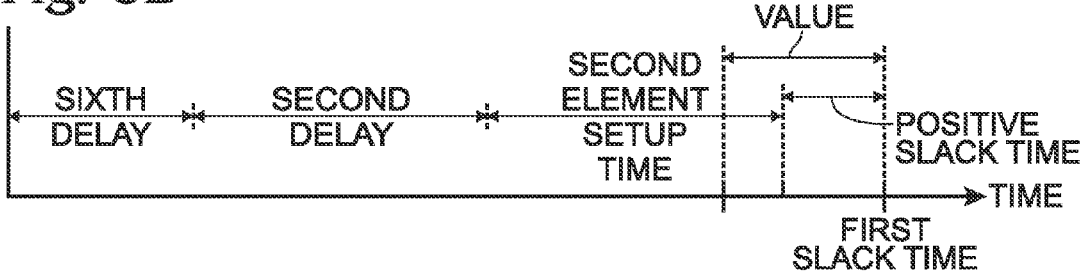

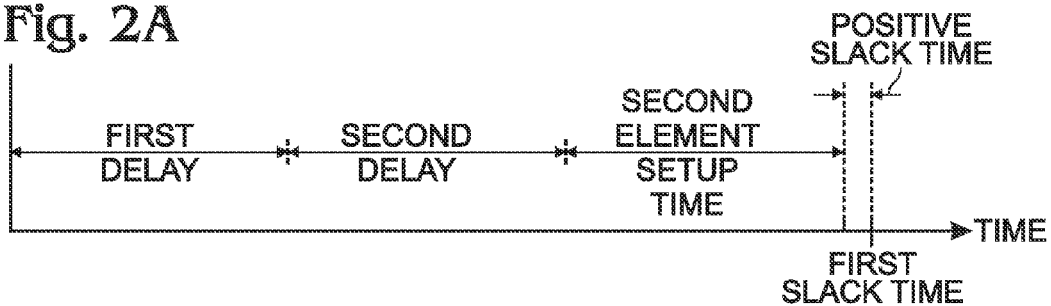
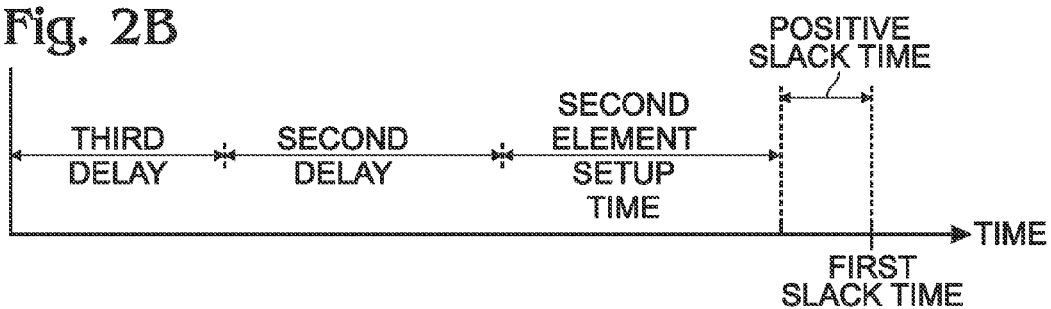
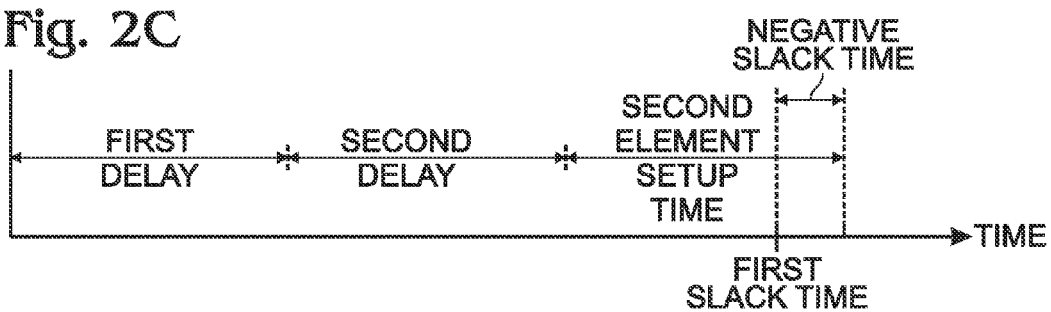
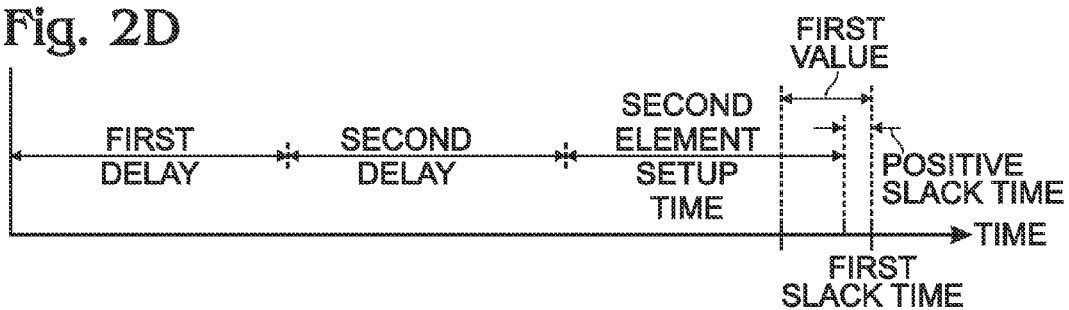

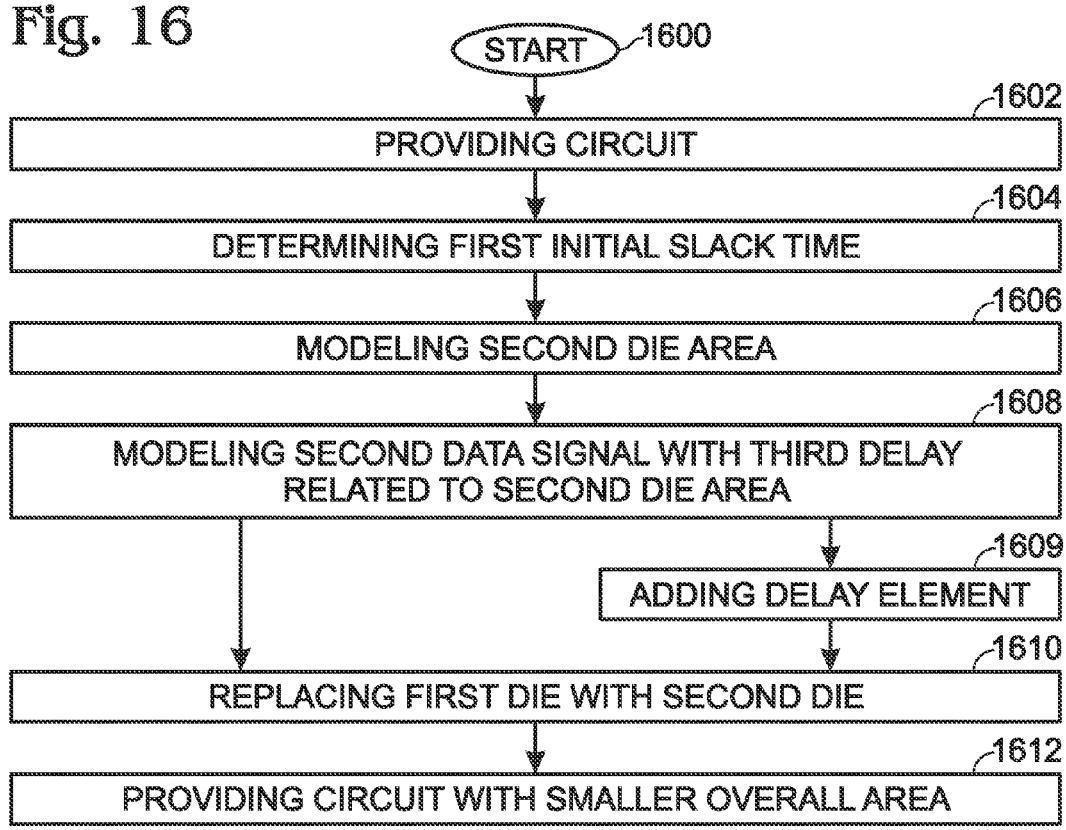

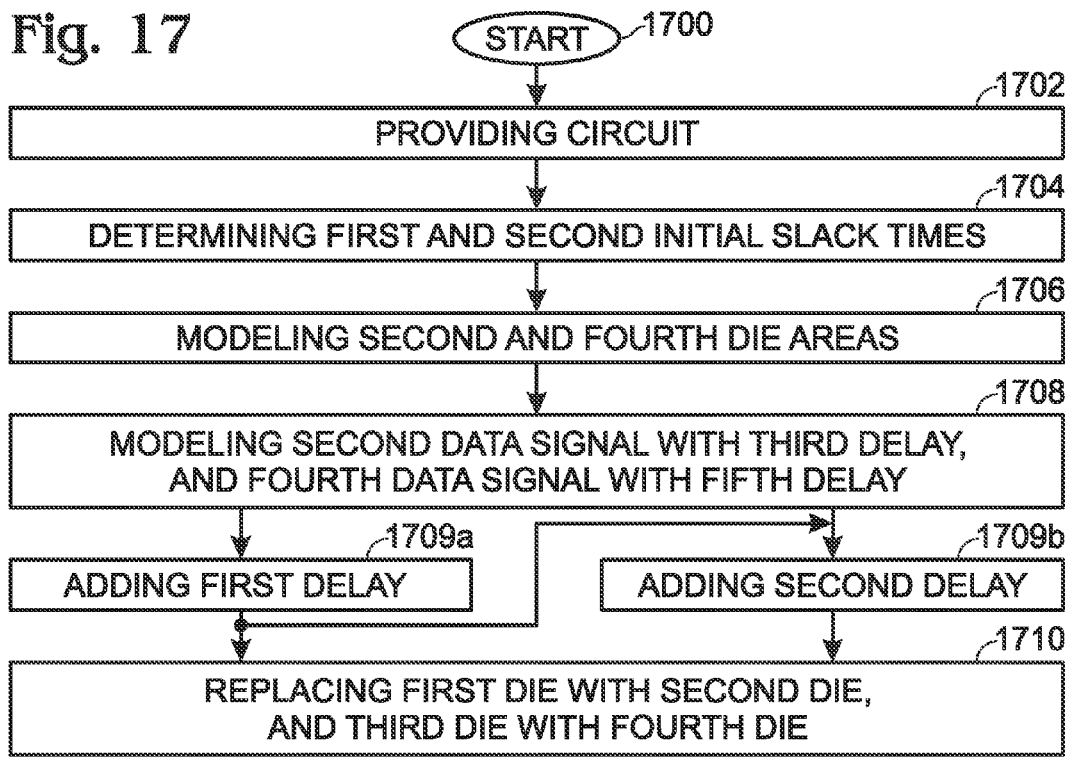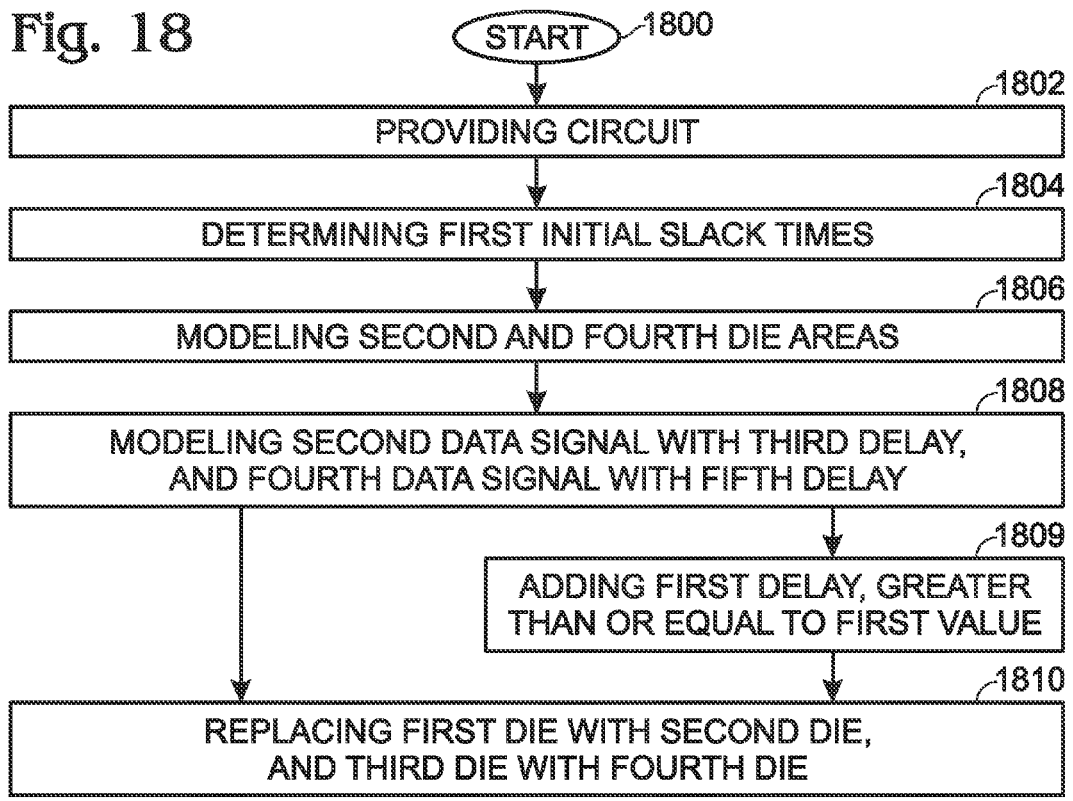

SYSTEM AND METHOD FOR INTEGRATED CIRCUIT DIE SIZE REDUCTION

BACKGROUND OF THE INVENTION

1. Field of the Invention

This invention generally relates to integrated circuit (IC) design and, more particularly, to a system and method for minimizing the size of circuit die in non-critical timing paths.

2. Description of the Related Art

The size, complexity, and operating or switching speeds of semiconductor ICs have increased, while feature geometries have decreased, and interconnect systems for such ICs have dramatically increased in complexity. In a digital circuit, data is suppose to move in lockstep, advancing one stage on each tick of the clock signal. This is enforced by synchronizing elements such as flip-flops or latches, which copy their input to their output when instructed to do so by the clock.

As noted in Wikipedia, one approach that is used to analyze timing errors is to model the interconnect system as an arrangement of nets (interconnections between gate outputs and interconnected gate inputs) inter-coupled with parasitic capacitors. Static Timing Analysis (STA) is used to develop early and late arrival times (timing window) for each relevant net or node. This timing window is enlarged by a worst case assessment of crosstalk noise for both early and late arrival times using noise aware STA. This worst case timing window is used for timing analysis of all paths through the corresponding net and a list of paths that fail timing requirements are provided. In static timing analysis, the word static alludes to the fact that this timing analysis is carried out in an input-independent manner, and purports to find the worst-case delay of the circuit over all possible input combinations.

More explicitly, STA is a method of computing the expected timing of a digital circuit without performing a simulation. High-performance ICs have conventionally been characterized by the clock frequency at which they operate. Gauging the operation of a circuit at a specified speed requires an ability to measure, during the design process, its delay at numerous steps. Moreover, delay calculations must be incorporated into the inner loop of timing optimizers at various phases of design, such as logic synthesis, layout (placement and routing), and in in-place optimizations performed late in the design cycle. While such timing measurements can theoretically be performed using a rigorous circuit simulation, such an approach is liable to be too slow to be practical. Static timing analysis plays a vital role in facilitating the fast and reasonably accurate measurement of circuit timing. The main goal of static timing analysis is to verify that despite these possible variations, all signals will arrive neither too early nor too late, and hence proper circuit operation can be assured. Faster design times are a result of using simplified STA delay models, and a limited consideration of the effects of logical interactions between signals.

Also, since STA is capable of verifying every path, apart from helping locate setup and hold time violations, it can detect other serious problems like glitches, slow paths and clock skew. The critical path is defined as the path between an input and an output with the maximum delay. Once the circuit timing has been computed by one of the techniques below, the critical path can easily be found by using a traceback method. The arrival time of a signal is the time elapsed for a signal to arrive at a certain point. The reference, or time 0.0, is often taken as the arrival time of a clock signal. To calculate the arrival time, delay calculation of all the components in the path is required. Arrival times, and indeed almost all times in timing analysis, are normally kept as a pair of values—the earliest possible time at which a signal can change, and the latest.

Required time is the latest time at which a signal can arrive without making the clock cycle longer than desired. The computation of the required time proceeds as follows. At each primary output, the required times for rise/fall are set according to the specifications provided to the circuit. Next, a backward topological traversal is carried out, processing each gate when the required times at all of its fanouts are known. The slack associated with each connection is the difference between the required time and the arrival time. A positive slack (s) at a node implies that the arrival time at that node may be increased by (s) without affecting the overall delay of the circuit. Conversely, negative slack implies that a path is too slow, and the path must be sped up (or the reference signal delayed) if the whole circuit is to work at the desired speed.

The behavior of an electronic circuit is often dependent on various factors in its environment like temperature and local voltage variations, or the die size. In such a case either STA needs to be performed for more than one such set of conditions, or STA must be prepared to work with a range of possible delays for each component, as opposed to a single value. If the design works at each extreme condition, then under the assumption of monotonic behavior, the design is also qualified for all intermediate points.

The use of corners in static timing analysis has several limitations. It may be overly optimistic, since it assumes perfect tracking—if one gate is fast, all gates are assumed fast, or if the voltage is low for one gate, it's also low for all others. Corners may also be overly pessimistic, for the worst case corner may seldom occur. In an IC, for example, it may not be rare to have one metal layer at the thin or thick end of its allowed range, but it would be very rare for all 10 layers to be at the same limit, since they are manufactured independently. Statistical STA, which replaces delays with distributions, and tracking with correlation, is a more sophisticated approach to the same problem.

Conventionally, slow signal path timing errors can be corrected by using higher performance parts. Similarly, timing slack can be traded against die size. While smaller sized dice typically perform more poorly, their use can shrink the overall area of an IC. Therefore, careful designing is done to maximize the use of small die size parts in non-critical regions.

It would be advantageous if there was a systematic approach to determine if the size of die in an IC could be made smaller without impacting non-critical timing signal paths, or signal paths with excessive slack timing.

SUMMARY OF THE INVENTION

Disclosed herein is a system and method for reducing the size of die, and so lowering the cost of fabricating integrated circuits (ICs). The use of smaller die sizes reduces power consumption lost through leakage, and relieves congestion in critical areas.

Accordingly, a circuit analysis tool is provided, enabled with software instructions stored in a computer-readable medium and executable by a processor, for die size reduction analysis. The instructions provide a circuit including a first circuit element having a signal input to accept a first data signal, and an output to supply a second data signal equal to the first data signal with a first delay. The first delay is associated with a first die area. A second circuit element has a signal input to accept the second data signal, a clock input to accept a clock signal having a clock frequency, and an output to supply a third data signal equal to the second data signal with a second delay. A processor determines a first initial output slack time between the second data signal and (the clock signal the second circuit element setup time). If the first initial output slack time is greater than zero, the first circuit element is modeled with a second die area, less than the first die area. The second die area is associated with a third delay greater than the first delay. A positive slack time indicates the occurrence of the second data signal prior to the occurrence of (the clock signal the second circuit element setup time). Then, the second data signal is modeled equal to the first data signal with the third delay. If a first modified output slack time is greater than or equal to zero, the first circuit element first die can be replaced with the second die. If the first modified output slack time is a first value less than zero, a first delay is added to the clock signal that is greater than or equal to the first value.

Additional details of the above-described method and an IC fabricated with circuit elements having a minimally sized die area are provided below.

BRIEF DESCRIPTION OF THE DRAWINGS

FIG. 1 is a schematic diagram depiction an integrated circuit (IC) fabricated with circuit elements having a minimally sized die area.

FIGS. 2A through 2D are timing diagrams depicting the relationship between the die size, slack times, and circuit element delays of FIG. 1.

FIGS. 6A through 6B are timing diagrams depicting the relationship between the die size, slack times, and circuit element delays of FIG. 5.

FIG. 16 is a flowchart illustrating a circuit analysis tool, enabled with software instructions stored in a computer-readable medium and executable by a processor, for die size reduction analysis.

FIG. 17 is a flowchart illustrating a variation of the method depicted in FIG. 16.

FIG. 18 is a flowchart illustrating a second variation of the method depicted in FIG. 16.

DETAILED DESCRIPTION

Figure 3:
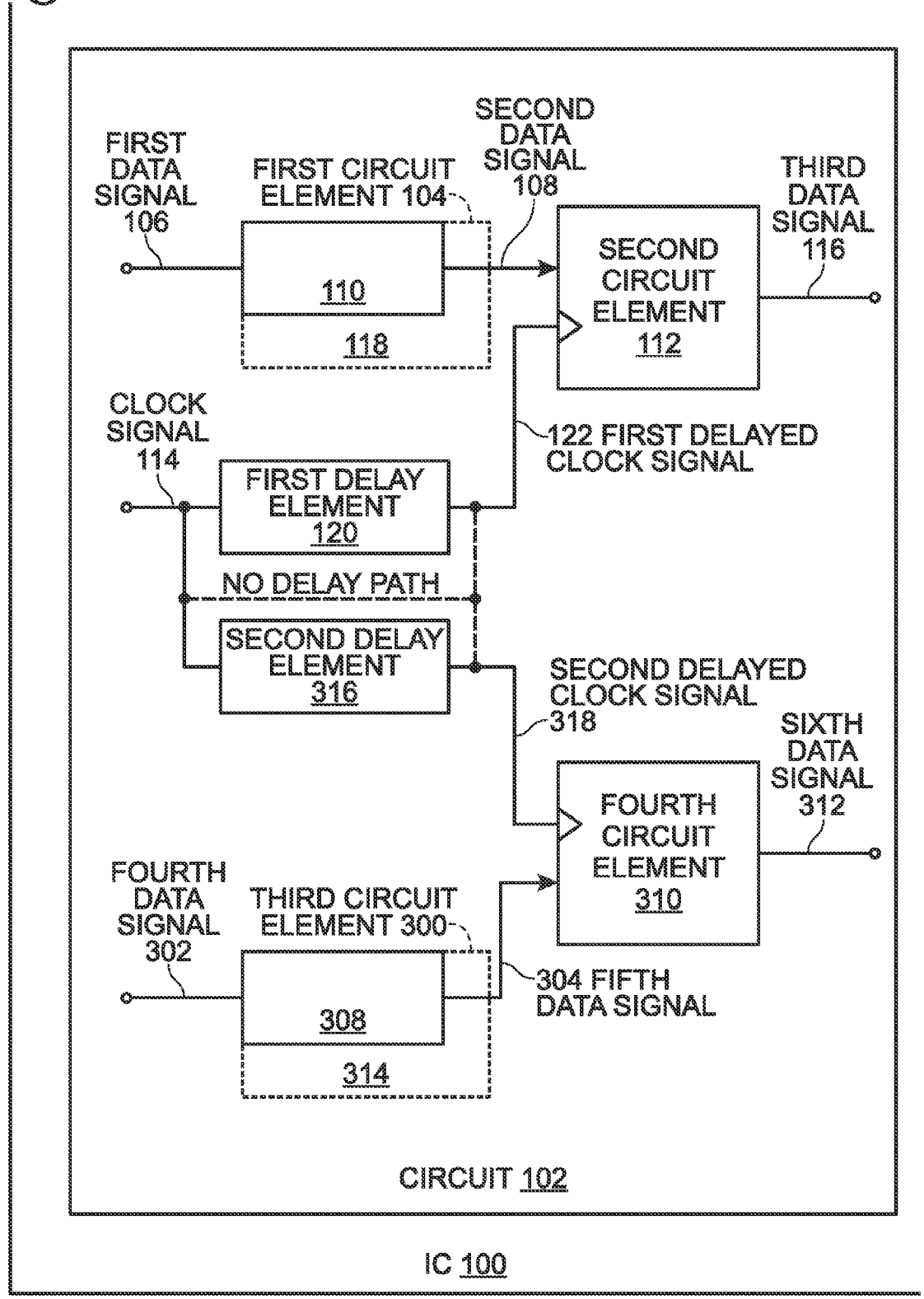
FIG. 3 is a schematic block diagram depicting a first variation of the IC of FIG. 1.

FIG. 1 is a schematic diagram depiction an integrated circuit (IC) fabricated with circuit elements having a minimally sized die area. The IC 100 comprises a circuit 102 including a first circuit element 104 having a signal input on line 106 to accept a first data signal, and an output on line 108 to supply a second data signal equal to the first data signal with a first delay. The first delay is associated with a first circuit element die area 110. A second circuit element 112 has a signal input on line 108 to accept the second data signal, a clock input on line 114 to accept a clock signal having a clock frequency, and an output on line 116 to supply a third data signal equal to the second data signal with a second delay. The circuit 102 has a first output slack time greater than or equal to zero. A positive slack time indicates the occurrence of the second data signal on line 108 before (the clock signal on line 114—the second circuit element setup time). The first output slack time is responsive to the first circuit element first die area 110. The first die area 110 is less than a first circuit element second die area 118 (in phantom), which is associated with a third delay, less than the first delay. Generally, a die with a larger area has a smaller signal delay than a die performing an equivalent function, but occupying a smaller area.

For simplicity, it can be assumed that the second element 112 is a flip/flop, latch, or other circuit requiring a clock to advance a signal from input to output. The first circuit element 104 can be a logic gate, passive circuit element, or active circuit element. Note: the dotted line connecting signal lines 114 and 122 signifies that the clock signal is provided directly to the second circuit element 122, bypassing the first delay element 120.

FIGS. 2A through 2D are timing diagrams depicting the relationship between the die size, slack times, and circuit element delays of FIG. 1. The slack time associated with first die area (first delay) is depicted in FIG. 2A. The slack time associated with the second die area (third delay) is depicted in FIG. 2B.

Returning to FIG. 1, the circuit 102 has a first overall area responsive to the first circuit element first die area 110 that is less than a second overall area, responsive to the first circuit element second die area 118. Likewise, the overall size of the IC 100 is reduced by using the first circuit element first die area 110 instead of the second die area 118.

If the second circuit element 112 has an output slack time with a first value less than zero (see FIG. 2C), responsive to the first circuit element first die area 110 and the clock signal on line 114, a first delay element 120 is added to the circuit 102. The first delay element 120 has an input on line 114 to accept the clock signal and an output on line 122 to supply a first delayed clock signal, equal to the clock signal delayed by the first value (or greater). The first delayed clock signal is supplied to the second circuit element 112 on line 122. Then, the circuit Å first output slack time is greater than or equal to zero (see FIG. 2D). That is, the second data signal on line 108 occurs prior to the occurrence of (the first delayed clock signal—the second circuit element setup time).

The second circuit element setup time is the period of time that the data signal to the circuit element (e.g., the latch of a flip-flop) should remain stable before the coming of active edge of the clock signal. If the signal at the data pin is not stable during the setup time requirement, then the output is unpredictable. The second delay is the delay at the output of the circuit element after the occurrence of the active clock edge. This delay is often called the clock-to-output delay (CK-Q delay).

FIG. 3 is a schematic block diagram depicting a first variation of the IC of FIG. 1. In this aspect the IC 100 further comprises a third circuit element 300 having a signal input on line 302 to accept the fourth data signal, and an output on line 304 to supply a fifth data signal equal to the fourth data signal with a fourth delay. The fourth delay is associated with a third die area 308. A fourth circuit element 310 has a signal input on line 304 to accept the fifth data signal, a clock input to accept the clock signal on line 114, and an output on line 312 to supply a sixth data signal equal to the fifth data signal with a fifth delay. The circuit 102 has a second output slack time greater than or equal to zero, where a positive slack time indicates the occurrence of the fifth data signal prior to the occurrence of (the clock signal ‡ the fourth circuit element setup time delay). The second output slack time is responsive to the third die area 308, which is less than a third circuit element fourth die area 314. The larger fourth die area 314 is associated with a sixth delay that is less than the third delay. Note: the dotted line connecting signal lines 114 and 122 signifies that the clock signal is provided directly to the second circuit element 122, bypassing the first delay element. Likewise, the dotted line connecting signal lines 114 and 318 signifies that the clock signal is provided directly to the fourth circuit element 310, bypassing the second delay element.

Figure 4A:
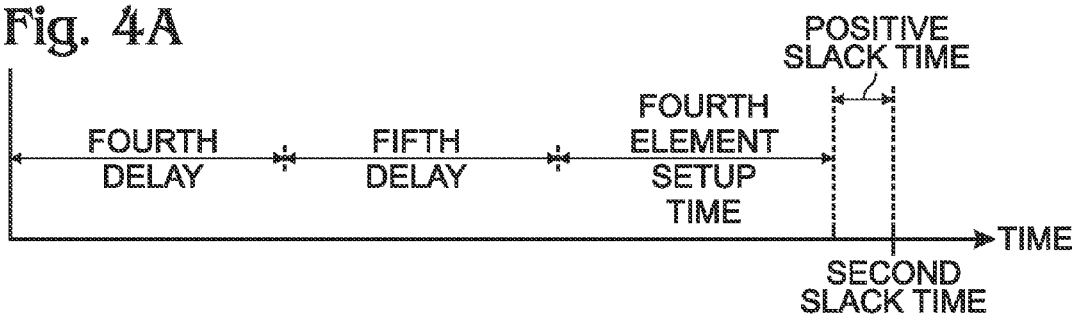
FIGS. 4A through 4D are timing diagrams depicting the relationship between the die size, slack times, and circuit element delays of FIG. 3.
Figure 4B:
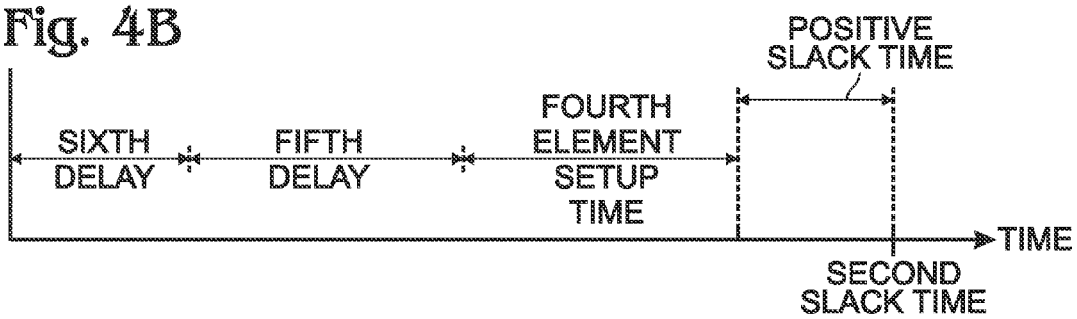
Figure 4C:
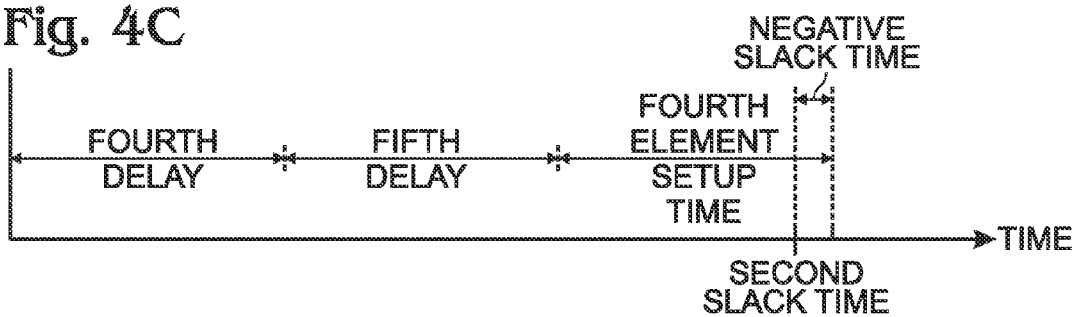
Figure 4D:
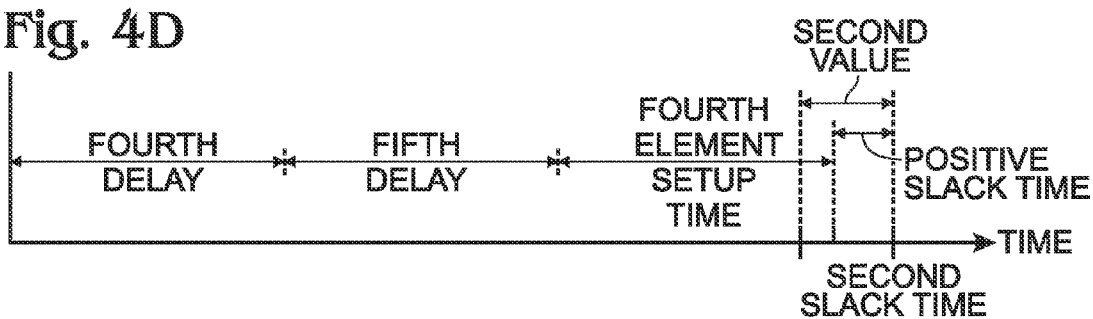

FIGS. 4A through 4D are timing diagrams depicting the relationship between the die size, slack times, and circuit element delays of FIG. 3. The slack time associated with third die area (third delay) is depicted in FIG. 4A. The slack time associated with the fourth die area (sixth delay) is depicted in FIG. 4B.

Returning to FIG. 3, if the second circuit element has an output slack time with a first value less than zero (see FIG. 2C), responsive to the first circuit element first die area and the clock signal on line 114, a first delay element 120 may be used. As in FIG. 1, the first delay element 120 has an input on line 114 to accept the clock signal and an output on line 122 to supply a first delayed clock signal, equal to the clock signal delayed by the first value. The first delayed clock signal is supplied to the second circuit element 112, and the circuit Å 102 first output slack time is made greater than or equal to zero (see FIG. 2D).

Likewise, if the fourth circuit element 310 has an output slack time with a second value less than zero, responsive to the third die area and the clock signal on line 114 (see FIG. 4C), a second delay element 316 can be used. The second delay element 316 has an input to accept the clock signal on line 114 and an output on line 318 to supply a second delayed clock signal, equal to the clock signal delayed by the second value. The second delayed clock signal is supplied to the fourth circuit element 310. The circuit Å 102 second output slack time is greater than or equal to zero (see FIG. 4D). If the second value is greater than the first value, then the second delay element can be replaced by the first delay element 120. That is, the first delay element 120 can supply the delayed clock signals of both lines 122 and 318. Likewise, if the second value is less than the first value, then the first delay element can be replaced by the second delay element 316. That is, the second delay element 316 can supply the delayed clock signals of both lines 122 and 318.

Figure 5:
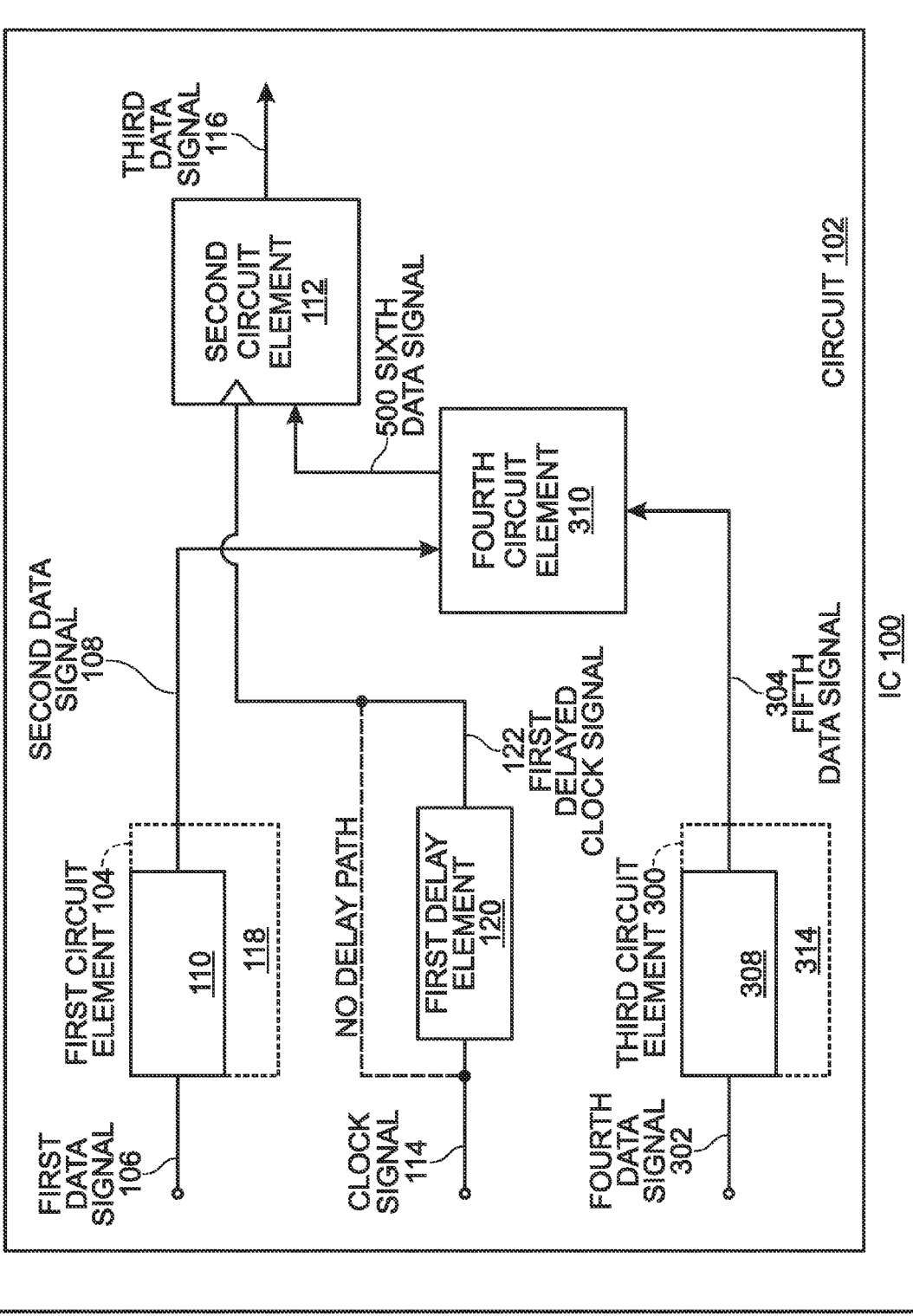
FIG. 5 is a schematic block diagram depicting a second variation of the IC of FIG. 1.

FIG. 5 is a schematic block diagram depicting a second variation of the IC of FIG. 1. As above, the first circuit element 110 has a signal input on line 106 to accept a first data signal, and an output on line 108 to supply the second data signal equal to the first data signal with a first delay. The first delay is associated with a first circuit element die area. In this aspect a third circuit element 300 has a signal input on line 302 to accept a fourth data signal, and an output on line 304 to supply a fifth data signal equal to the fourth data signal with a fourth delay. The fourth delay is associated with a third die area 308. A fourth circuit element 310 has an input to accept the second data signal on line 108 and an input to accept the fifth data signal on line 304. The fourth circuit element supplies a sixth data signal with a sixth delay on line 500 that is responsive to the second and fifth data signals.

The second circuit element 112 has a signal input on line 500 to accept the sixth data signal. The third data signal on line 116 has a second delay responsive to the sixth data signal on line 500. The circuit 102 has a first slack time where the sixth data signal on line 500 occurs at or before (the clock signal on line 114—the second circuit element setup time). The circuit Å 102 first output slack time is responsive to the first die area, which is less than a second die area associated with a third delay that is less than the first delay. The first output slack time is also responsive to the third die area, which is less than a third circuit element fourth die area associated with a fifth delay that is less than the third delay. Note: the dotted line connecting signal lines 114 and 122 signify that the clock signal is provided directly to the second circuit element 122, bypassing the first delay element.

FIGS. 6A through 6B are timing diagrams depicting the relationship between the die size, slack times, and circuit element delays of FIG. 5.

Returning to FIG. 5, if the second circuit 112 element has an output slack time with a first value less than zero, responsive to the first die area 110, the third die area 308, and the clock signal on line 114 (see FIG. 6A), then the first delay element 120 may be used. The first delay element 120 has an input on line 114 to accept the clock signal and an output on line 122 to supply a first delayed clock signal, equal to the clock signal delayed by the first value, to the second circuit element 112. Then, the circuit Å 102 first output slack time (FIG. 6B) is zero or positive, with the sixth data signal occurring prior to the occurrence of (the first delayed clock signal ‡ the second circuit element setup time delay).

Functional Description

Figure 7:
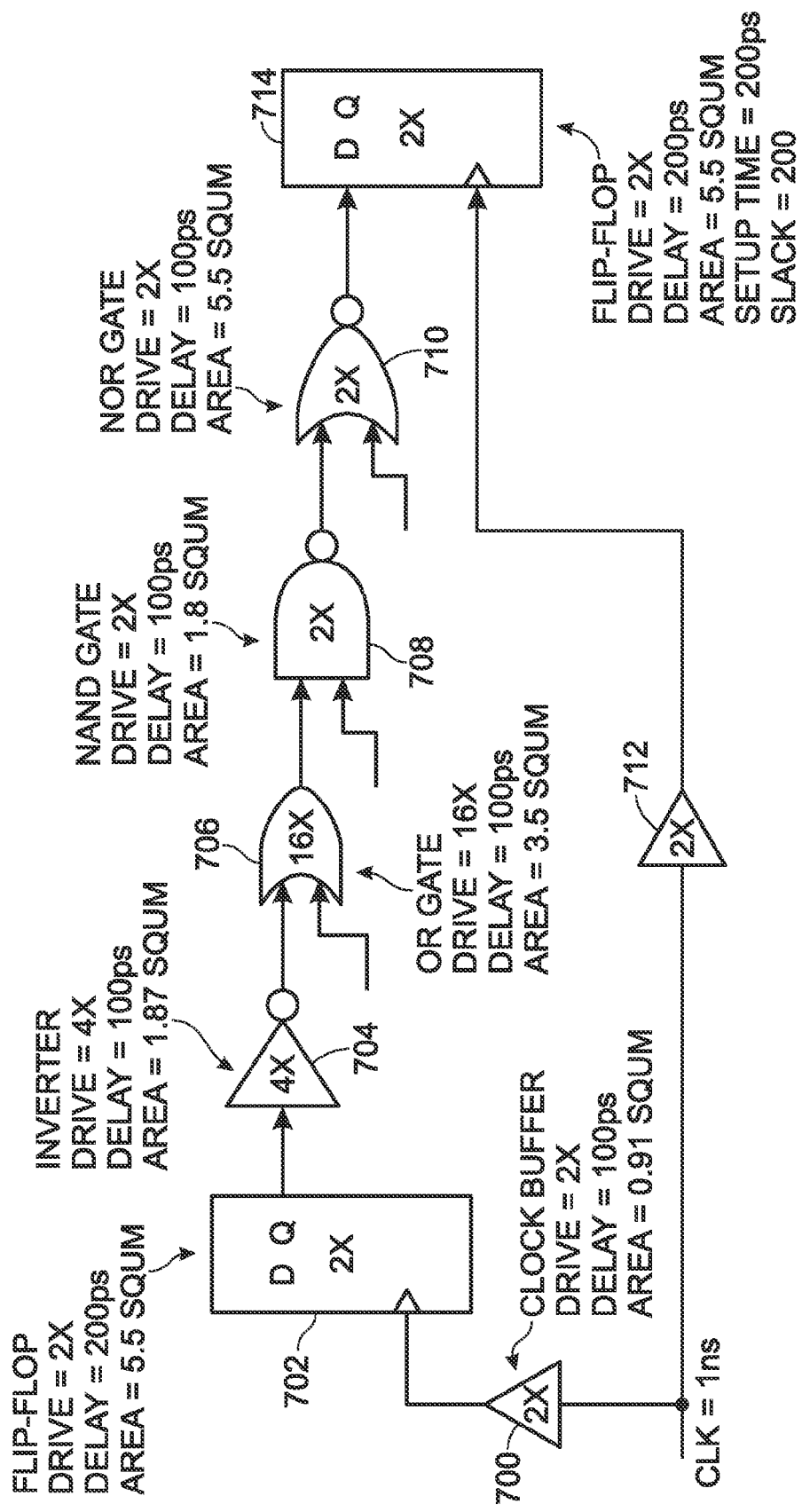
FIG. 7 is a schematic block diagram of a circuit with an initial slack time of 200 picoseconds (ps).

FIG. 7 is a schematic block diagram of a circuit with an initial slack time of 200 picoseconds (ps). Area recovery is technique used for logic area reduction in non-critical timing paths. The information associated with each circuit element in the figure shows its area, delay, and drive strength.

Slack=Required Time ‡ Arrival Time (1)

Arrival Time=Launch Clock Insertion Delay+circuit delay+Datapath Delay (2)

Required Time=Clock Period+Capture clock Insertion Delay ‡ Setup time (3)

Arrival Time=100 ps+200 ps+(100 ps+100 ps+100 ps+100 ps)=700 ps ‡ using (2)

Required Time=1000 ps (1 ns)+100 ps ‡ 200 ps=900 ps ‡ using (3)

Slack=900 ps−700 ps=200 ps ‡ using (1)

Total Area=(area of cells in clock path)+(area of launch and capture clock circuit element)+(area of data path components) (4)

Total Area=(0.91+0.91)+(5.5+5.5)+(1.87+3.5+1.8+ 5.5)‡ using (4)

=25.49 squm (square microns)

Figure 8:
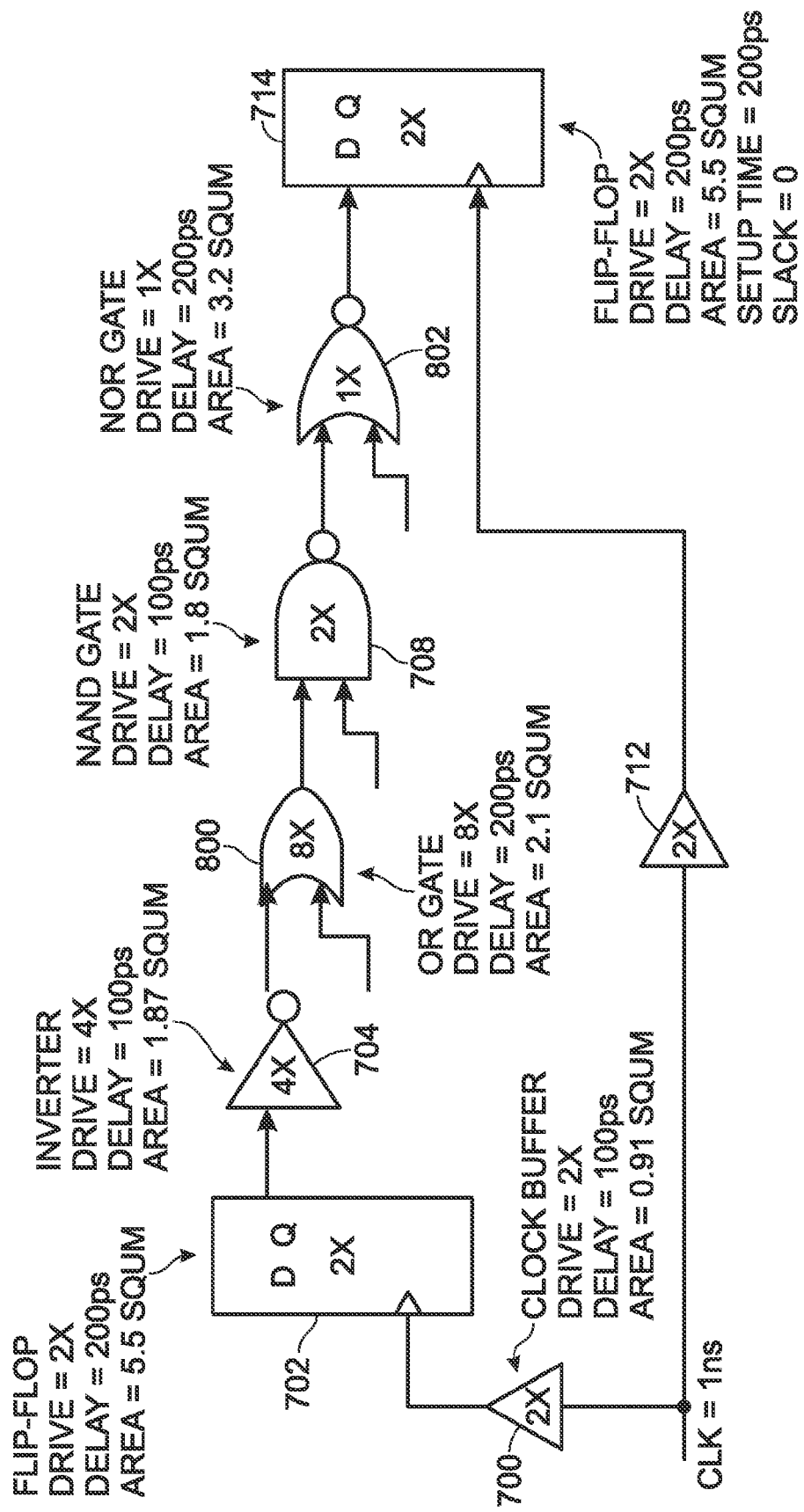
FIG. 8 is a schematic block diagram depicting a revision of the circuit of FIG. 7.

FIG. 8 is a schematic block diagram depicting a revision of the circuit of FIG. 7. Since a 200 ps positive slack exists in the timing path, the data path cells can be downsized in exchange for reducing the margin of slack. In FIG. 8, the OR gate 16×

(706 in FIG. 7) is downsized to OR gate 8×800 and the NOR 2× (710 of FIG. 7) is downsized to 1×802.

Using equations 1, 2, 3, and 4, a new slack value and total area are calculated below:

Arrival Time=100 ps+200 ps+(100 ps+200 ps+100 ps+200 ps)=900 ps ‡ using (2)

Required Time=1000 ps (1 ns)+100 ‡ ps 200 ps=900 ps ‡ using (3)

Slack=900 ps-900 ps=0 ps ‡ using (1)

Total Area=(0.91+0.91)+(5.5+5.5)+(1.87+2.1+1.8+ 3.2)–using (4)=

=21.79 squm

From the above equations, it is clear that the area is decreased from 25.49 to 21.79 squm, which is a 3.7 squm (11.76%) area savings in the timing path. Thus, high drive strength standard cells sizes can be reduced to low drive strength standard cells or high threshold voltage (Vt) cells, as long as the slack is greater than or equal to zero. Any extra timing margin or slack in the non-critical paths can be traded by properly rebuilding the clock tree with additional delay elements. In any system-on-chip (SOC) an average of 10-15% of the timing paths are timing critical. By carefully building the rest of the 85-90% non-critical timing paths with proper clock tree delays, 2-3% of logic area or die size can be saved.

The technique is applicable to three types of timing paths commonly found in an SOC. The first type of timing path is a simple single path formed between one register and another register, as shown in FIG. 1. In a multipath fanout cone there are timing paths from multiple registers to one single register, as shown in FIG. 5. In a multipath fanin cone there are timing paths from one register to multiple registers, as shown in FIG. 3.

Returning to FIG. 8, at this point in the design process the designer can no longer trade slack for reduced die area. As shown in the equations above, the slack time is already equal to zero. Since the slack time is equal to zero, the designer is unable to give up any slack time in the attempt to reduce die area.

Figure 9:
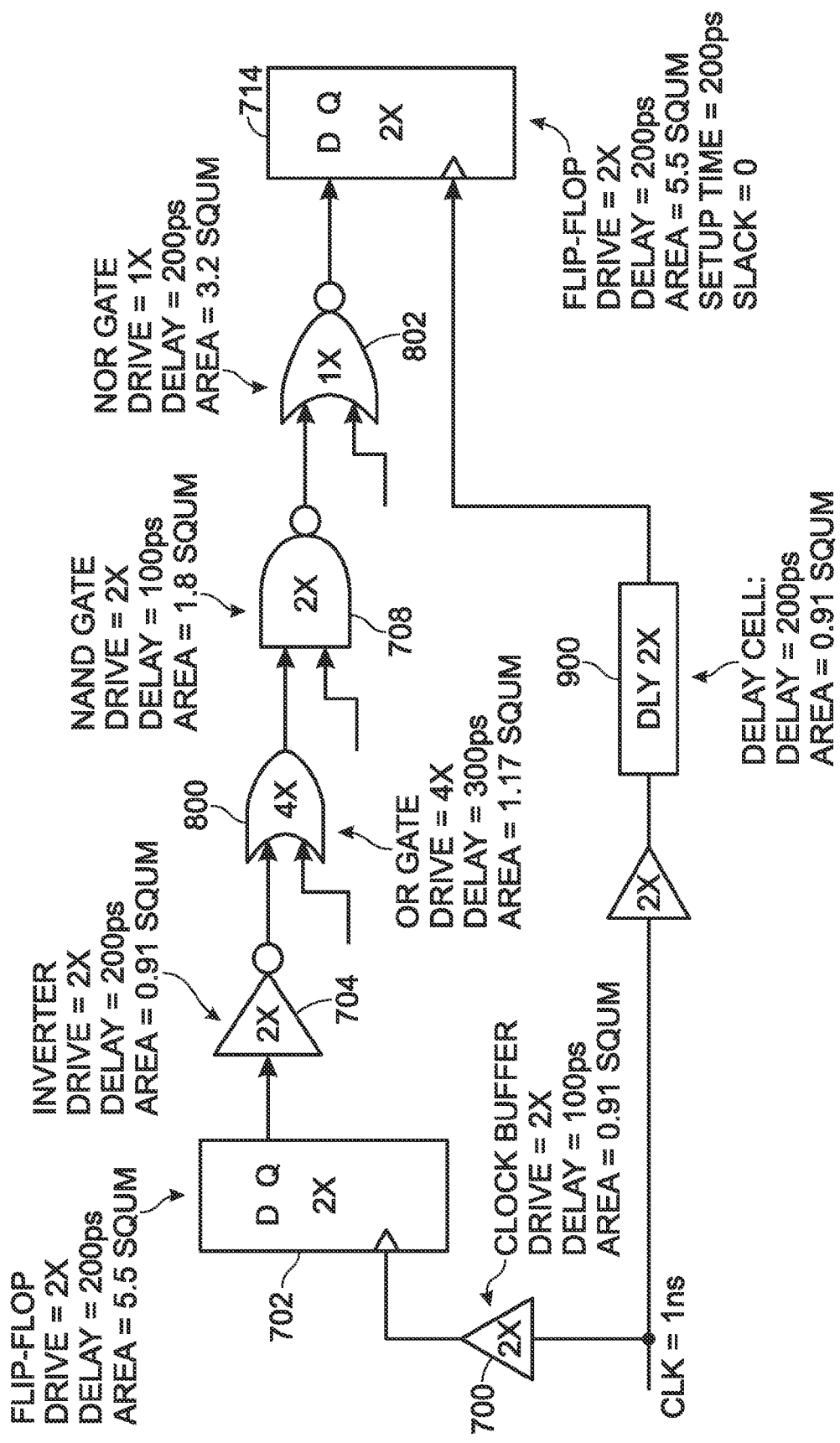
FIG. 9 is a schematic block diagram depicting the circuit of FIG. 8 with an additional delay element.

FIG. 9 is a schematic block diagram depicting the circuit of FIG. 8 with an additional delay element. Using equations 1, 2, 3, and 4, a new slack value and total area are calculated below:

Arrival Time=100 ps+200 ps+(200 ps+300 ps+100 ps+200 ps)=1100 ps ‡ using (2)

Required Time=1000 ps (1 ns)+100 ps+200 ps (Delay Cell)‡ 1200 ps=1100 ps ‡ using (3)

Slack=1100 ps-1100 ps=0 ps ‡ using (1)

Total Area=(0.91+0.91)+(5.5+5.5)+(0.91+1.17+1.8+ 3.2)+0.91 (Delay cell)–using (4)

=20.81 squm

Starting with an initial slack of zero, additional slack is created by including the delay element 900 in the capture clock path, creating a slack of 200 ps. Now, the total area is reduced from 21.79 squm to 20.81 squm through, saving an additional 0.98 squm (4% of total area). By performing the same optimization in all the timing paths, at least 2-3% total area can be reduced, which is directly proportional to die size.

Figure 10:
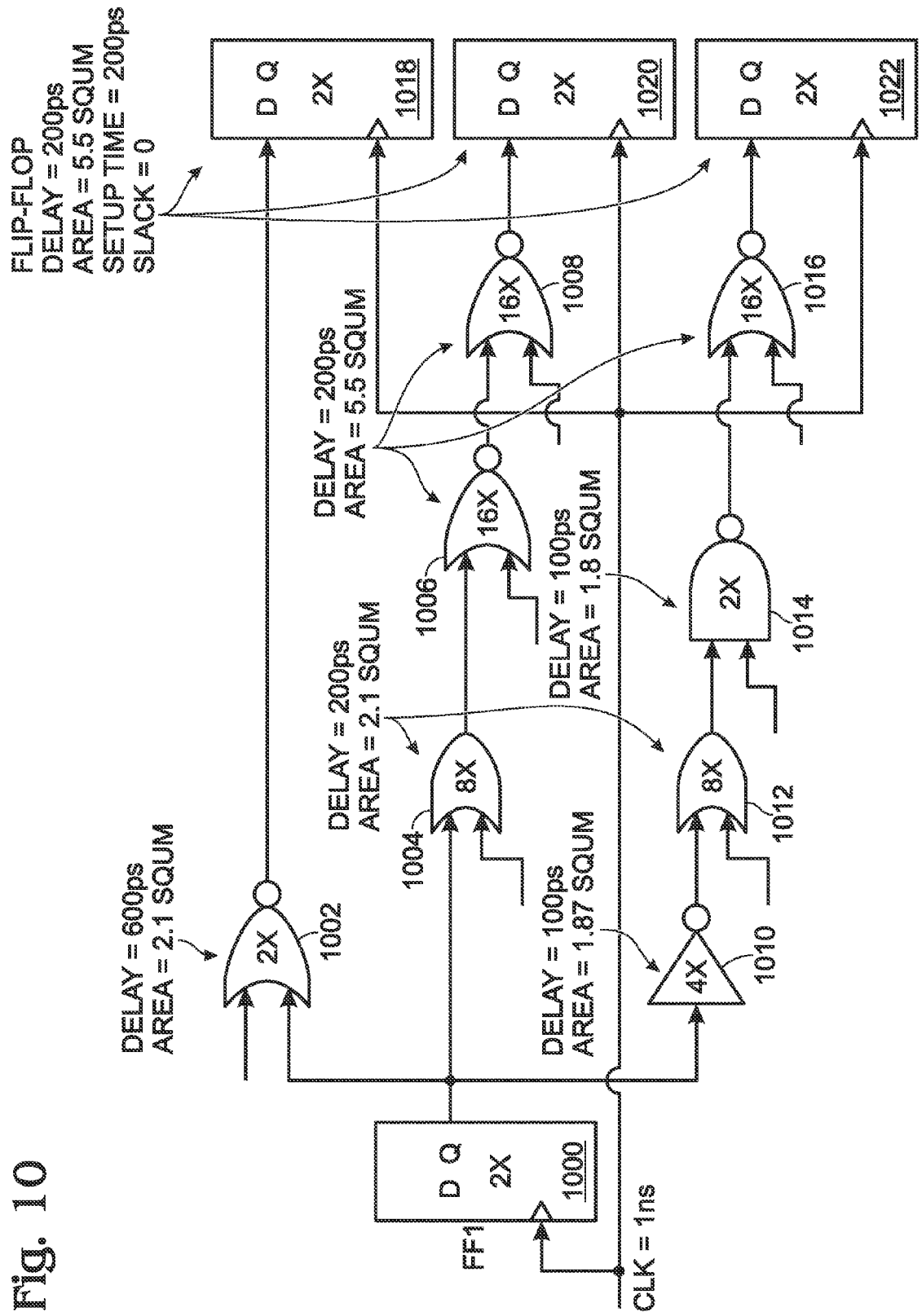
FIG. 10 is a schematic block diagram depicting a multipath fanout cone circuit design.

FIG. 10 is a schematic block diagram depicting a multipath fanout cone circuit design. Using equations 1, 2, 3, and 4, a slack value and total area are calculated below:

The Required Time is common for all the three paths

Required Time=1000 ps (1 ns)+0 ps ‡ 200 ps=800 ps ‡ using (3)

Arrival Time for 3 paths
FF1 to FF2

Arrival Time=0 ps+200 ps+(600)=800 ps ‡ using (2)

Slack=800 ps-800 ps=0 ps ‡ using (1)

FF1 to FF3

Arrival Time=0 ps+200 ps+(200+200+200)=800 ps ‡ using (2)

Slack=800 ps-800 ps=0 ps ‡ using (1)

FF1 to FF4

Arrival Time=0 ps+200 ps+(100 ps+200 ps+100 ps+200 ps)

=800 ps ‡ using (2)

Slack=800 ps-800 ps=0 ps ‡ using (1)

Total Area=(0+0)+(5.5+5.5)+(2.1) of FF1 to FF2+ (2.1+5.5+5.5) of FF1 to FF3+(1.87+2.1+1.8+5.5) of FF1 to FF4–using (4)

=37.47 squm

Since the slack is equal to zero, slack cannot be traded for reduced die area.

Figure 11:
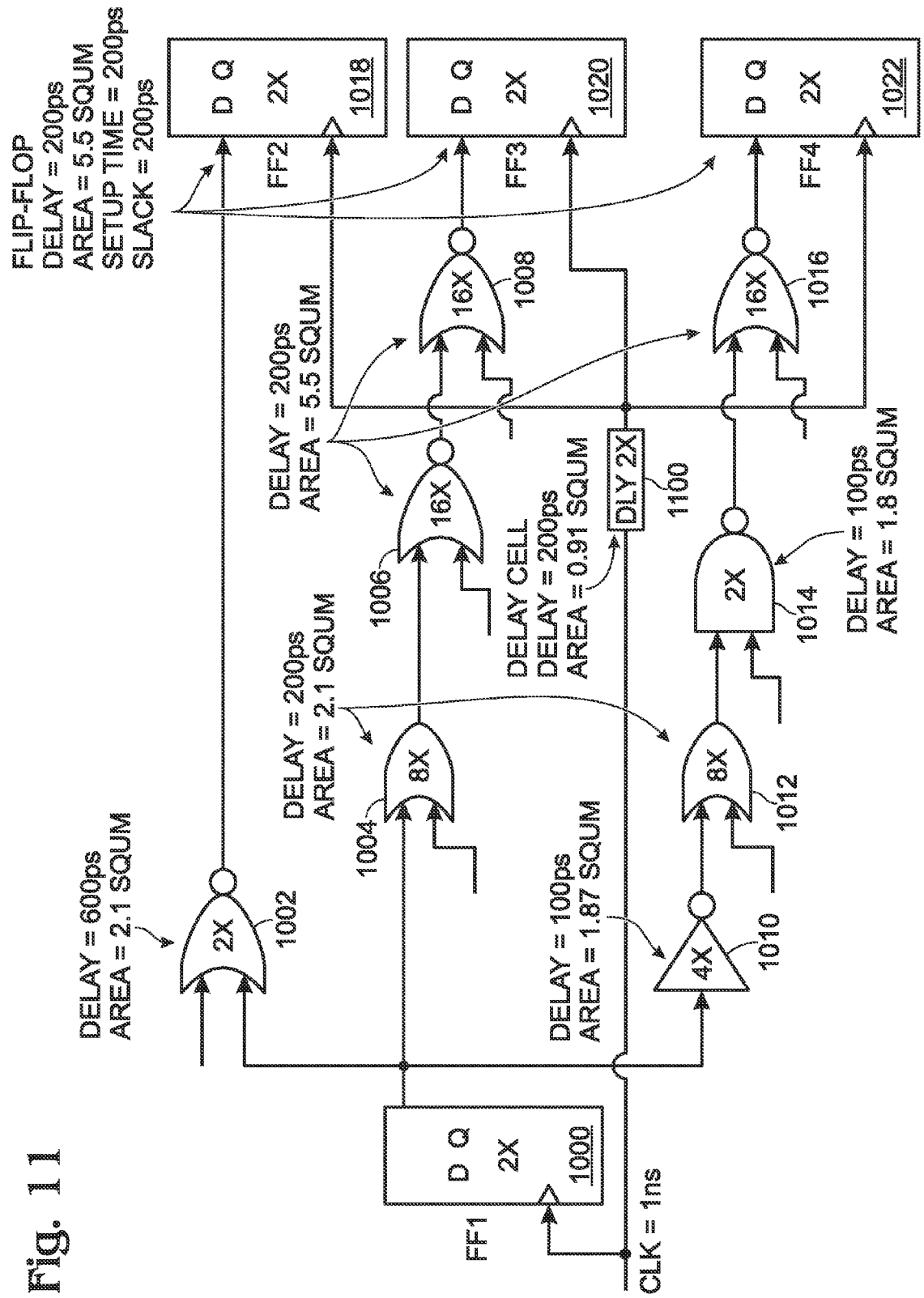
FIG. 11 is a schematic block diagram depicting the circuit of FIG. 10 with a delay element in the clock path.

FIG. 11 is a schematic block diagram depicting the circuit of FIG. 10 with a delay element in the clock path. Equations 1 through 4 are recalculated below with the addition of the delay element 1100, resulting in a positive slack of 200 ps. Required Time is common for all the three paths Required Time=1000 ps (1 ns)+200 ps ‡ 200 ps=1000 ps ‡ using (3)

Arrival Time for 3 paths
FF1 to FF2

Arrival Time=0 ps+200 ps+(600)=800 ps ‡ using (2)

Slack=1000 ps-800 ps

=200 ps ‡ using (1)

FF1 to FF3

Arrival Time=0 ps+200 ps+(200+200+200)

=800 ps ‡ using (2)

Slack=1000 ps-800 ps

=200 ps ‡ using (1)

FF1 to FF4

Arrival Time=0 ps+200 ps+(100 ps+200 ps+100 ps+200 ps)

=800 ps ‡ using (2)

Slack=1000 ps-800 ps

=200 ps ‡ using (1)

Figure 12:
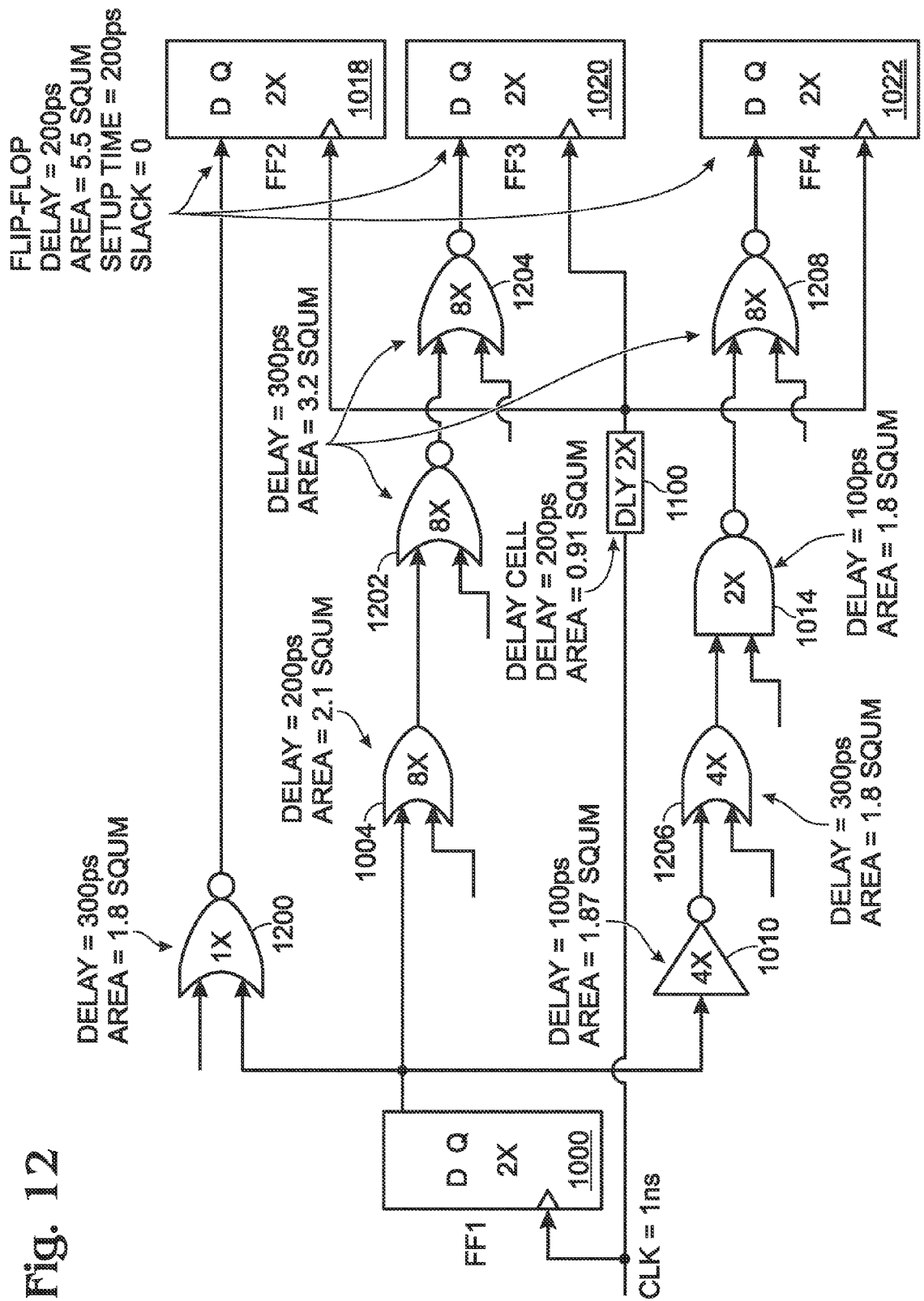
FIG. 12 is a schematic block diagram depicting the circuit of FIG. 11 with a downsized circuit area.

FIG. 12 is a schematic block diagram depicting the circuit of FIG. 11 with a downsized circuit area. The die areas are reduced as a result of positive slack created by the addition of the delay element. The slack time and area are calculated below:

Required Time is common for all the three paths

Required Time=1000 ps (1 ns)+200 ps ‡ 200 ps=1000 ps ‡ using (3)

Arrival Time for 3 paths
FF1 to FF2

Arrival Time=0 ps+200 ps+(800)

=1000 ps ‡ using (2)

Slack=1000 ps−1000 ps

=0 ps ‡ using (1)

FF1 to FF3

Arrival Time=0 ps+200 ps+(200+300+300)

=1000 ps ‡ using (2)

Slack=1000 ps−1000 ps

=0 ps ‡ using (1)

FF1 to FF4

Arrival Time=0 ps+200 ps+(100 ps+300 ps+100 ps+300 ps)

=1000 ps ‡ using (2)

Slack=1000 ps−1000 ps

=0 ps ‡ using (1)

Total Area=(0+0)+(5.5+5.5)+(1.8) of FF1 to FF2+ (2.1+3.2+3.2) of FF1 to FF3+(1.87+1.8+1.8+3.2) of FF1 to FF4+(0.91) of Delay cell−using (4)

=30.88 squm

The logic area saved using delay element 1100 is (37.47 squm ‡ 30.88 squm)=6.59 squm (17.5%).

Figure 13:
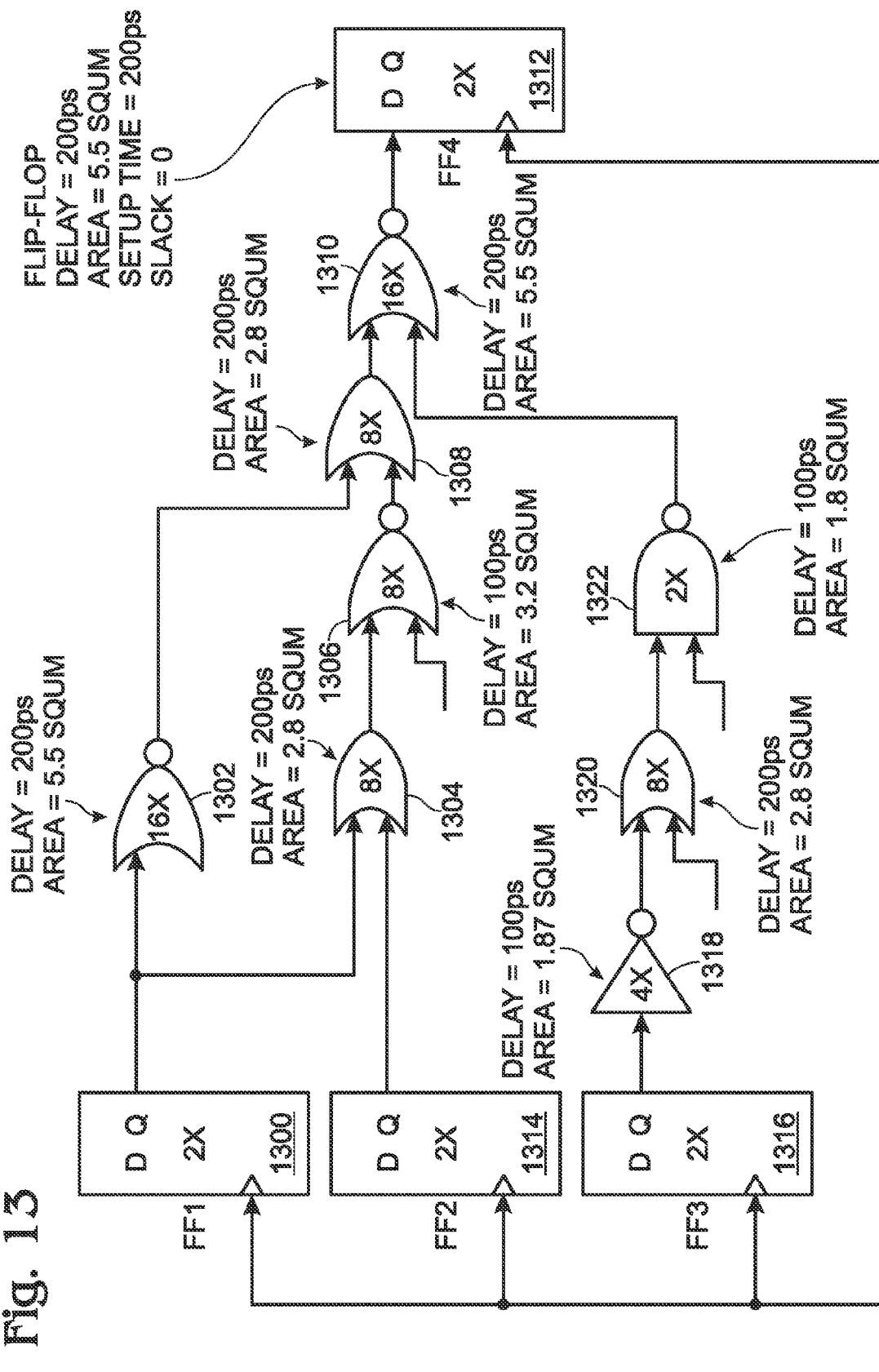
FIG. 13 is a schematic block diagram depicting a multipath fanin cone design.

FIG. 13 is a schematic block diagram depicting a multipath fanin cone design. As shown in the calculations below, there is zero slack time.

Required Time is common for all the three paths

Required Time=1000 ps (1 ns)‡ 200 ps

=800 ps ‡ using (3)

Arrival Time for 3 paths
FF1 to FF4

Arrival Time=0 ps+200 ps+(200+200+200) ps

=800 ps ‡ using (2)

Slack=800 ps−800 ps

=0 ps ‡ using (1)

FF2 to FF4
Arrival Time=0 ps+200 ps+(100+100+200+200)

=800 ps ‡ using (2)

Slack=800 ps−800 ps

=0 ps ‡ using (1)

FF3 to FF4

Arrival Time=0 ps+200 ps+(100 ps+200 ps+100 ps+200 ps)

=800 ps ‡ using (2)

Slack=800 ps−800 ps

=0 ps ‡ using (1)

Total Area=(0+0)+(5.5+5.5)+(5.5) of FF1 to FF4+ (2.8+3.2+2.8+5.5) of FF2 to FF4+(1.87+2.8+1.8) of FF3 to FF4−using (4)

=37.27 squm.

Figure 14:
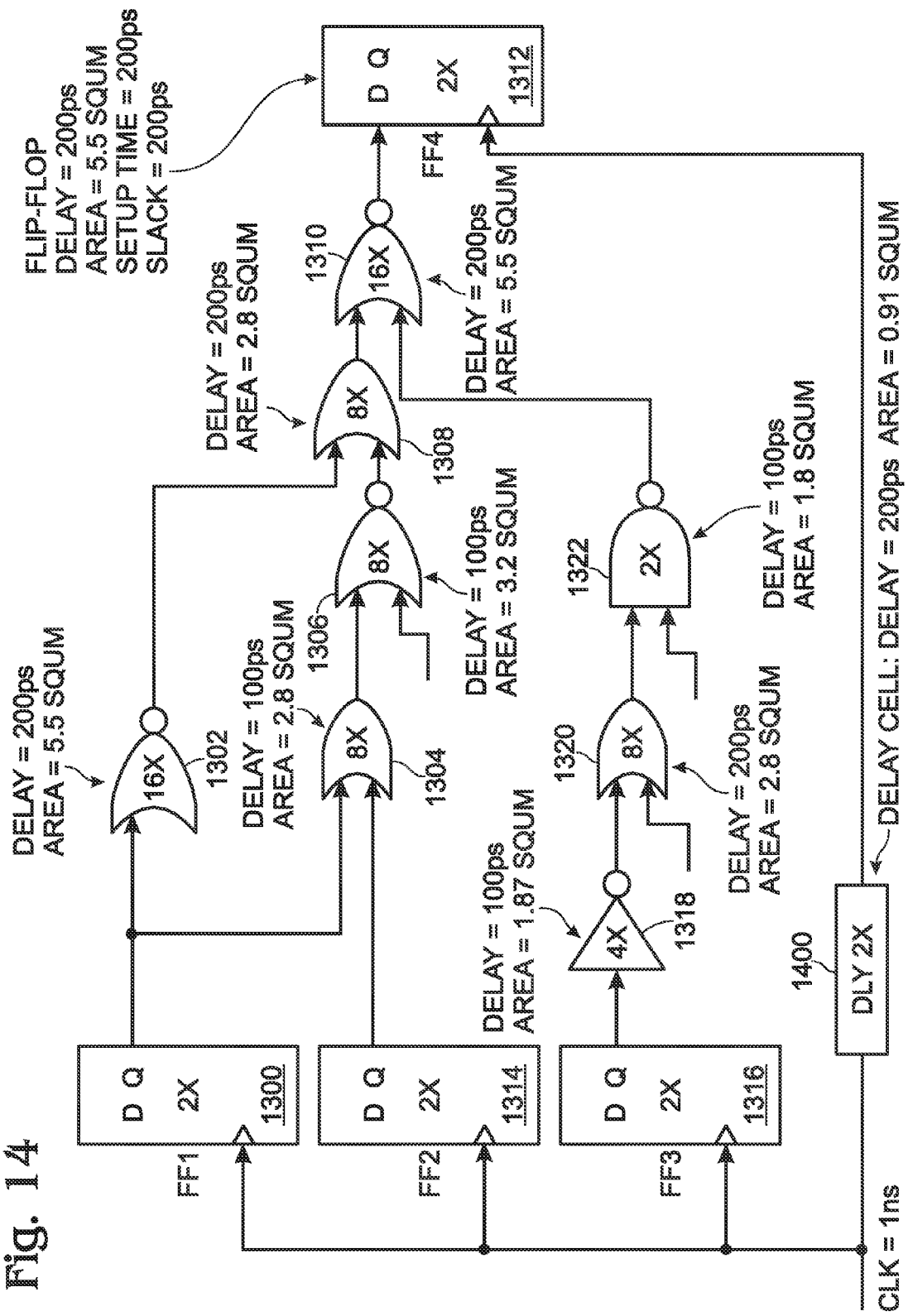
FIG. 14 is a schematic block diagram of FIG. 13 with an additional delay element in the clock signal line.

FIG. 14 is a schematic block diagram of FIG. 13 with an additional delay element in the clock signal line. The delay element 1400 added to the capture flop FF4 creates positive slack values to this endpoint from all the registers (FF1, FF2 and FF3). The updated slack values are shown below:

Required Time is common for all the three paths

Required Time=1000 ps (1 ns)+200 ps of Delay cell ‡ 200 ps

=1000 ps ‡ using (3)

Arrival Time for 3 paths
FF1 to FF4

Arrival Time=0 ps+200 ps+(200+200+200) ps

=800 ps ‡ using (2)

Slack=1000 ps−800 ps

=200 ps ‡ using (1)

FF2 to FF4
Arrival Time=0 ps+200 ps+(100+100+200+200)

=800 ps ‡ using (2)

Slack=1000 ps−800 ps

=200 ps ‡ using (1)

FF3 to FF4

Arrival Time=0 ps+200 ps+(100 ps+200 ps+100 ps+200 ps)

=800 ps ‡ using (2)

Slack=1000 ps−800 ps

=200 ps ‡ using (1)

Figure 15:
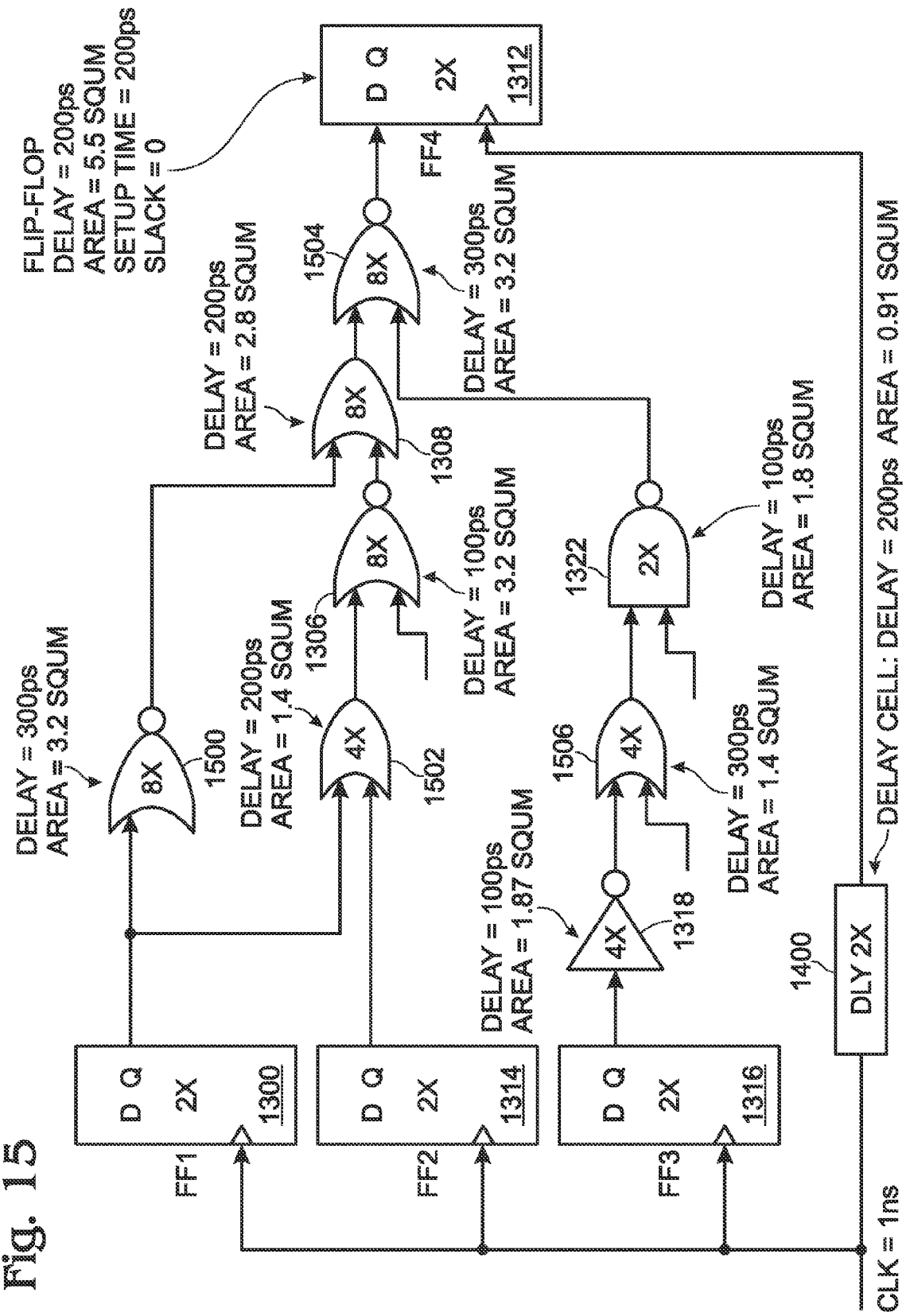
FIG. 15 is a schematic block diagram depicting the circuit of FIG. 14 downsized in area as a result of the positive slack time.

FIG. 15 is a schematic block diagram depicting the circuit of FIG. 14 downsized in area as a result of the positive slack time. As noted above, the positive slack time is created as a result of adding delay element 1400.

Required Time is common for all the three paths

Required Time=1000 ps (1 ns)+200 ps of Delay cell ‡ 200 ps

=1000 ps ‡ using (3)

Arrival Time for 3 paths
FF1 to FF4

Arrival Time=0 ps+200 ps+(300+200+300)ps

=1000 ps ‡ using (2)

Slack=1000 ps−1000 ps

=0 ps ‡ using (1)

FF2 to FF4

Arrival Time=0 ps+200 ps+(200+100+200+300)

=1000 ps ‡ using (2)

Slack=1000 ps−1000 ps

=0 ps ‡ using (1)

FF3 to FF4

Arrival Time=0 ps+200 ps+(100 ps+300 ps+100 ps+300 ps)

=800 ps ‡ using (2)

Slack=1000 ps−1000 ps

=0 ps ‡ using (1)

Total Area=(0+0)+(5.5+5.5)+(3.2) of FF1 to FF4+ (1.4+3.2+2.8+3.2) of FF2 to FF4+(1.87+1.4+1.8) of FF3 to FF4−using (4)

=29.87 squm

The logic area savings with delay element is (37.27 squm 29.87 squm)=9.4 squm (25.28%).

Table 1 summarizes the area saved using the techniques described in the explanation of FIGS. 7 through 15.

TABLE 1

| Scenarios | Total Area without Delay Element squm | Total Area with Delay Element squm | Net Savings in Area with Delay element squm | Percentage saving * 100 |
|---|---|---|---|---|
| Single Path | 21.79 | 20.81 | 0.98 | 4 |
| Multipath Fanout Cone | 37.47 | 30.88 | 6.59 | 17.5 |
| Multipath Fanin Cone | 37.27 | 29.87 | 9.4 | 25.28 |

FIG. 16 is a flowchart illustrating a circuit analysis tool, enabled with software instructions stored in a computer-readable medium and executable by a processor, for die size reduction analysis. The use of computers to read and execute instructions from memory is well known in the art, and the instructions are not limited to any particular protocol or computer hardware.

Various steps in the instructions may be referred to as a component, module, system, and the like, and are intended for use with an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The instructions described herein are stored on a physical memory medium or computer-readable medium. As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Although the method performed by the instructions is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The instructions start at Step 1600.

Step 1602 provides a circuit including a first circuit element having a signal input to accept a first data signal, and an output to supply a second data signal equal to the first data signal with a first delay. The first delay is associated with a first die area. The circuit also includes a second circuit element having a signal input to accept the second data signal, a clock input to accept a clock signal having a clock frequency, and an output to supply a third data signal equal to the second data signal with a second delay. The first and second circuit elements may be input by an operator or associated design application.

In Step 1604 a processor determines a first initial output slack time. If the first initial output slack time is greater than zero, where a positive slack time indicates the occurrence of the second data signal prior to the occurrence of the (clock signal—the second circuit element setup time delay), Step 1606 models a first circuit element second die area, less than the first die area. The second die area is associated with a third delay greater than the first delay. Step 1608 models the second data signal equal to the first data signal with the third delay. If a first modified output slack time is greater than or equal to zero, Step 1610 replaces the first circuit element first die with the second die.

In one aspect, providing the circuit in Step 1602 includes providing an initial circuit having a first overall area responsive to the first circuit element first die area. Then, in response to changing the first die area to the second die area, Step 1612 provides a modified circuit having a second overall area, less than the first overall area.

In another aspect, if the first modified output slack time is a first value less than zero, Step 1609 adds a first delay to the clock signal greater than or equal to the first value.

FIG. 17 is a flowchart illustrating a variation of the method depicted in FIG. 16. The method starts at Step 1700. Step 1702 provides a circuit including a first circuit element having a signal input to accept a first data signal, and an output to supply a second data signal equal to the first data signal with a first delay. The first delay is associated with a first die area. The circuit also includes a second circuit element having a signal input to accept the second data signal, a clock input to accept a clock signal having a clock frequency, and an output to supply a third data signal equal to the second data signal with a second delay. The circuit elements may be input by an operator or associated design application. A third circuit element is provided having a signal input to accept a fourth data signal, and an output to supply a fifth data signal equal to the fourth data signal with a fourth delay, where the fourth delay is associated with a third die area. A fourth circuit element is provided having a signal input to accept the fifth data signal, a clock input to accept the clock signal, and an output to supply a sixth data signal equal to the fifth data signal with a fifth delay.

In Step 1704 a processor determines a first initial output slack time between the second data signal and (the clock signal ‡ the second circuit element setup time delay). Step 1704 additionally determines a second initial slack time between the fifth data signal and (the clock signal ‡ fourth circuit element setup time delay). If the first initial output slack time is greater than zero, Step 1706 is performed as described above in the explanation of Step 1606 (FIG. 16). That is, the second die area is modeled. If the second initial output slack time is greater than zero, Step 1706 also models a third circuit element fourth die area, less than the third die area. The fourth die area is associated with a fifth delay greater than the fourth delay. Step 1708 models the second data signal equal to the first data signal with the third delay, and models the fifth data signal equal to the fourth data signal with the fifth delay. If a first modified output slack time is greater than or equal to zero, Step 1710 replaces the first circuit element first die with the second die. If a second modified output slack time is greater than or equal to zero, Step 1710 replaces the third circuit element third die with the fourth die.

If the first modified output slack time is a first value less than zero, Step 1709a adds a first delay to the clock signal, greater than or equal to the first value, supplied to the second circuit element. If the second modified output slack time is a second value less than zero, Step 1709b adds a second delay to the clock signal, greater than or equal to the second value, supplied to the fourth circuit element. If the second value is greater (less negative) than the first value, Step 1709b adds the first delay to the clock signal supplied to the fourth circuit element. Alternately, if the first value is greater (less negative) than the second value, Step 1709a adds the second delay to the clock signal supplied to the second circuit element.

FIG. 18 is a flowchart illustrating a second variation of the method depicted in FIG. 16. The method starts at Step 1800. Step 1802 provides a circuit including a first circuit element having a signal input to accept a first data signal, and an output to supply a second data signal equal to the first data signal with a first delay. The first delay is associated with a first die area. The circuit elements may be input by an operator or associated design application. A third circuit element is provided having a signal input to accept a fourth data signal, and an output to supply a fifth data signal equal to the fourth data signal with a fourth delay, where the fourth delay is associated with a third die area. A fourth circuit element has signal inputs to accept the fifth data signal and the second data signal, and an output to supply a sixth data signal (with a sixth delay) responsive the fifth and second data signals. The circuit also includes a second circuit element having a signal input to accept the sixth data signal, a clock input to accept a clock signal having a clock frequency, and an output to supply a third data signal equal to the sixth data signal with a second delay.

In Step 1804 a processor determines a first initial output slack time between the sixth data signal and (the clock signal ‡ second circuit element setup time delay). If the first initial output slack time is greater than zero, Step 1806 is performed as described above in the explanation of Step 1606 (FIG. 16). That is, the circuit is modeled with the second die instead of the first die. Further, Step 1806 models a third circuit element fourth die area, less than the third die area. The fourth die area is associated with a fifth delay greater than the fourth delay. Step 1808 models the second data signal equal to the first data signal with the third delay, and models the fifth data signal equal to the fourth data signal with the fifth delay. If a first modified output slack time is greater than or equal to zero, Step 1810 replaces the first circuit element first die with the second die, and replaces the third circuit element third die with the fourth die.

If the first modified output slack time is a first value less than zero, Step 1809 adds a first delay to the clock signal, greater than or equal to the first value, supplied to the second circuit element.

Systems and methods have been provided for useful for the reduction of circuit die area. Particular circuit elements and process steps have been used to illustrate the invention, but the invention is not necessarily limited to just these examples. Other variations and embodiments of the invention will occur to those skilled in the art.

We claim:

1. A circuit analysis tool, enabled with software instructions stored in a computer-readable medium and executable by a processor, for die size reduction analysis, the instructions comprising:
   providing a circuit including:
      a first circuit element having a signal input to accept a first data signal, and an output to supply a second data signal equal to the first data signal with a first delay, where the first delay is associated with a first die area;
      a second circuit element having a signal input to accept the second data signal, a clock input to accept a clock signal having a clock frequency, and an output to supply a third data signal equal to the second data signal with a second delay;
   a processor determining a first initial output slack time;
   when the first initial output slack time is greater than zero, where a positive slack time indicates the occurrence of the second data signal prior to the occurrence of the clock signal, wherein the clock signal is associated with the second circuit element setup time delay, modeling a first circuit element in second die area, less than the first die area, where the second die area is associated with a third delay greater than the first delay;
   modeling the second data signal equal to the first data signal with the third delay; and,
   if a first modified output slack time is greater than or equal to zero, wherein the first modified output slack time is the third delay output;
   if the first modified output slack time is a first value less than zero, a first delay is added to the clock signal that is greater than or equal to the first value.

2. The method of claim 1 wherein providing the circuit includes providing an initial circuit having a first overall area responsive to the first circuit element first die area; and,
   the method further comprising:
   in response to changing the first die area to the second die area, providing a modified circuit having a second overall area, less than the first overall area.

3. The method of claim 1 further comprising:
   if the first modified output slack time is a first value less than zero, adding a first delay to the clock signal greater than or equal to the first value.

4. The method of claim 1 wherein providing the circuit includes providing:
- a third circuit element having a signal input to accept a fourth data signal, and an output to supply a fifth data signal equal to the fourth data signal with a fourth delay, where the fourth delay is associated with a third die area;
- a fourth circuit element having a signal input to accept the fifth data signal, a clock input to accept the clock signal, and an output to supply a sixth data signal equal to the fifth data signal with a fifth delay;
- wherein determining the first initial output slack time additionally includes determining a second initial slack time between the fifth data signal and the clock signal, wherein the clock signal is associated with the fourth circuit element setup time delay;
- if the second initial output slack time is greater than zero, modeling a third circuit element fourth die area, less than the third die area, where the fourth die area is associated with a fifth delay greater than the fourth delay;
- modeling the fifth data signal equal to the fourth data signal with the fifth delay; and,
- if a second modified output slack time is greater than or equal to zero, replacing the third circuit element third die with the fourth die.

5. The method of claim 4 further comprising:
- if the first modified output slack time is a first value less than zero, adding a first delay to the clock signal, greater than or equal to the first value, supplied to the second circuit element.

6. The method of claim 5 further comprising:
- if the second modified output slack time is a second value less than zero, adding a second delay to the clock signal, greater than or equal to the second value, supplied to the fourth circuit element.

7. The method of claim 6 wherein, if the second value is greater (less negative) than the first value, adding the first delay to the clock signal supplied to the fourth circuit element.

8. An integrated circuit (IC) fabricated with circuit elements having a minimally sized die area, the IC comprising:
- a circuit including:
  - a first circuit element having a signal input to accept a first data signal, and an output to supply a second data signal equal to the first data signal with a first delay, where the first delay is associated with a first circuit element die area;
  - a second circuit element having a signal input to accept the second data signal, a clock input to accept a clock signal having a clock frequency, and an output to supply a third data signal equal to the second data signal with a second delay; and,
- wherein the circuit has a first output slack time greater than or equal to zero, where a positive slack time indicates the occurrence of the second data signal prior to the occurrence of the clock signal, wherein the clock signal is associated with the second circuit element setup time delay, and where the first output slack time is responsive to the first die area, which is less than a second die area associated with a third delay that is less than the first delay
- wherein modeling the second data signal equal to the first data signal with the third delay;
- if a first modified output slack time is greater than or equal to zero, replacing the first circuit element first die with the second die, wherein the first modified output slack time is the third delay output; and
- if the first modified output slack time is a first value less than zero, a first delay is added to the clock signal that is greater than or equal to the first value.

9. The IC of claim 8 wherein the circuit has a first overall area is responsive to the first die area, which is less than a second overall area, and responsive to the first circuit element second die area.

10. The IC of claim 8 wherein the second circuit element has an output slack time with a first value less than zero, responsive to the first die area and the clock signal;
- the circuit further including:
  - a first delay element having an input to accept the clock signal and an output to supply a first delayed clock signal, equal to the clock signal delayed by the first value, to the second circuit element; and,
- wherein the first output slack time is greater than or equal to zero.

11. The IC of claim 8 wherein the circuit further includes:
- a third circuit element having a signal input to accept a fourth data signal, and an output to supply a fifth data signal equal to the fourth data signal with a fourth delay, where the fourth delay is associated with a third die area;
- a fourth circuit element having a signal input to accept the fifth data signal, a clock input to accept the clock signal, and an output to supply a sixth data signal equal to the fifth data signal with a fifth delay; and,
- wherein the circuit has a second output slack time greater than or equal to zero, where a positive slack time indicates the occurrence of the fifth data signal prior to the occurrence of the clock signal, wherein the clock signal is associated with the fourth circuit element setup time delay, and where the second output slack time is responsive to the third die area, which is less than a third circuit element fourth die area associated with a sixth delay that is less than the third delay.

12. The IC of claim 11 wherein the second circuit element has an output slack time with a first value less than zero, responsive to the first circuit element first die area and the clock signal;
- the circuit further including:
  - a first delay element having an input to accept the clock signal and an output to supply a first delayed clock signal, equal to the clock signal delayed by the first value, to the second circuit element; and,
- wherein the first output slack time is greater than or equal to zero.

13. The IC of claim 12 wherein the fourth circuit element has an output slack time with a second value less than zero, responsive to the third die area and the clock signal;
- the circuit further including:
  - a second delay element having an input to accept the clock signal and an output to supply a second delayed clock signal, equal to the clock signal delayed by the second value, to the fourth circuit element; and,
- wherein the circuit Å second output slack time is greater than or equal to zero.

14. The IC of claim 13 wherein the second delay element is the first delay element, if the second value is greater than the first value.

* * * * *